United States Patent [19]

Binder

[11] Patent Number: 4,483,612

[45] Date of Patent: Nov. 20, 1984

[54] DEVICE TO POSITION A COPY MASTER IN A COPYING APPARATUS

[75] Inventor: Erich G. Binder, Buchs, Switzerland

[73] Assignee: Gretag Aktiengesellschaft, Regensdorf, Switzerland

[21] Appl. No.: 480,079

[22] Filed: Mar. 29, 1983

[30] Foreign Application Priority Data

Apr. 23, 1982 [CH] Switzerland ............... 2501/82

[51] Int. Cl.³ .................. G03B 27/62; G03B 27/64
[52] U.S. Cl. ........................... 355/76; 226/48; 352/221; 355/99
[58] Field of Search ............... 355/76, 50, 51, 99–103; 352/221, 229; 226/48

[56] References Cited

U.S. PATENT DOCUMENTS

| | | | |
|---|---|---|---|
| 2,110,475 | 3/1938 | Schubert | 355/76 |
| 2,174,020 | 9/1939 | Sumner | 352/221 |
| 2,248,646 | 7/1941 | Small | 355/76 |
| 3,132,560 | 5/1964 | Pignone et al. | 355/76 X |
| 3,488,120 | 1/1970 | Nagel | 352/221 X |

FOREIGN PATENT DOCUMENTS 336842 10/1930 United Kingdom ............... 355/76

*Primary Examiner*—Richard A. Wintercorn
*Attorney, Agent, or Firm*—Burns, Doane, Swecker & Mathis

[57] ABSTRACT

Two pairs of pivotable flap clamps are arranged on a copy master stage in the area of its exposure window, each pair having flaps respectively disposed above and below the master plane. The pairs of flaps are driven by means of an electromagnet and can be symmetrically opened and closed relative to the master plane. In their closed state, the flaps hold the copy master on two opposing sides with their front edges. Additionally, spring elastic hold-down strips are provided to hold the copy master on its lateral sides. By means of the bilateral clamping of the copy masters with the two pairs of flap clamps, an absolutely flat position of the copy master is obtained. The positioning device is particularly suitable for processing copy masters in which short strips of film or individual images are spaced apart on a carrier strip.

8 Claims, 5 Drawing Figures

DEVICE TO POSITION A COPY MASTER IN A COPYING APPARATUS

BACKGROUND OF THE INVENTION

The present invention relates to a device for positioning a copy master in the focal plane of a copying apparatus.

In automatic continuous copying installations, e.g., photographic printers, the copy master is usually held in the copying position on the master stage by means of a hold-down plate, with the plate in most cases being equipped with lead-in bevels to prevent catching parts of the master that protrude from the transport path on the plate. Such hold-down plates operate satisfactorily if relatively long, continuous film strips are involved. In the case of noncontinuous copy masters, if for example individual images or short film strips are lined up at spaced intervals on a carrier strip, as is usually done with reorders, these hold-down plates have a disadvantage. More particularly, the copy master, at least at its leading edge which in the copying position is located exactly in the area of the lead-in bevel, is not held down and therefore the normally present curvatures and warps of the master are not eliminated, which in turn leads to defective copies.

OBJECT AND BRIEF SUMMARY OF THE INVENTION

It is the object of the present invention to improve a positioning device of this type so that it no longer has these shortcomings and, particularly in the case of noncontinuous copy masters, a satisfactory flat position of the copy masters is assured.

In accordance with the present invention, two pairs of pivotable flap clamps are arranged on a copy master stage in the area of its exposure window, each pair having flaps respectively disposed above and below the master plane. The pairs of flaps are driven by means of an electromagnet and can be symmetrically opened and closed relative to the master plane. In their closed state, the flaps hold the copy master on two opposing sides with their front edges. Additionally, spring elastic hold-down strips are provided to hold the copy master on its lateral sides. By means of the bilateral clamping of the copy masters by the two pairs of flap clamps an absolutely flat position of the copy master is obtained. The positioning device is particularly suitable for processing copy masters in which short strips of film or individual images are spaced apart on a carrier strip.

Further appreciation of the features and advantages of the invention can be gained from the following detailed description of a preferred embodiment thereof illustrated in the accompanying drawings.

DETAILED DESCRIPTION

Figure 2:
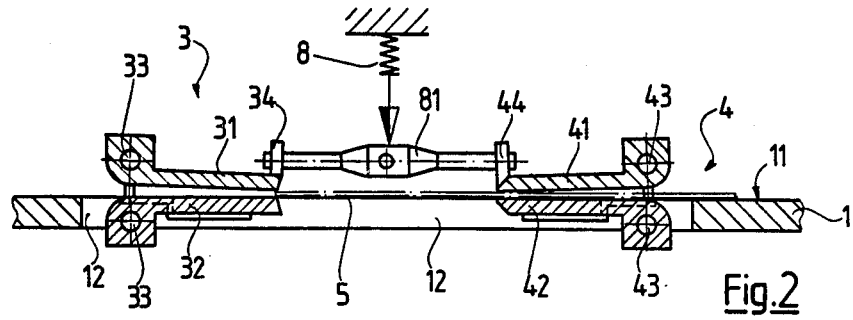
FIG. 2 is a similar cross-sectional view along the line II—II of FIG. 3 with the flap clamps closed.

In the drawing only the essential parts of the positioning device that are necessary for an understanding of the invention are shown. These components comprise a master stage 1 for supporting the device, with the upper, flat surface of the master stage defining the master (focal) plane 11 or coinciding with it, two pairs 3 and 4 of flap clamps for guiding and holding copy masters 5, two lateral hold-down strips 6 and 7 and various drive means for actuating the pairs of flap clamps and the hold-down strips.

Figure 1:
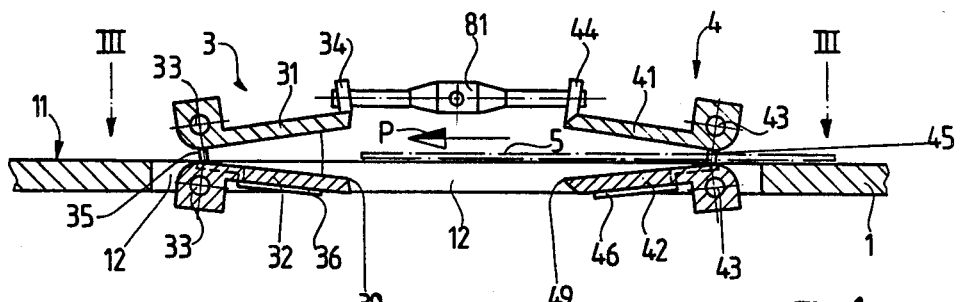
FIG. 1 is a cross-sectional side view through the positioning device along the section line I—I of FIG. 3, with the flap clamps open.
Figure 3:
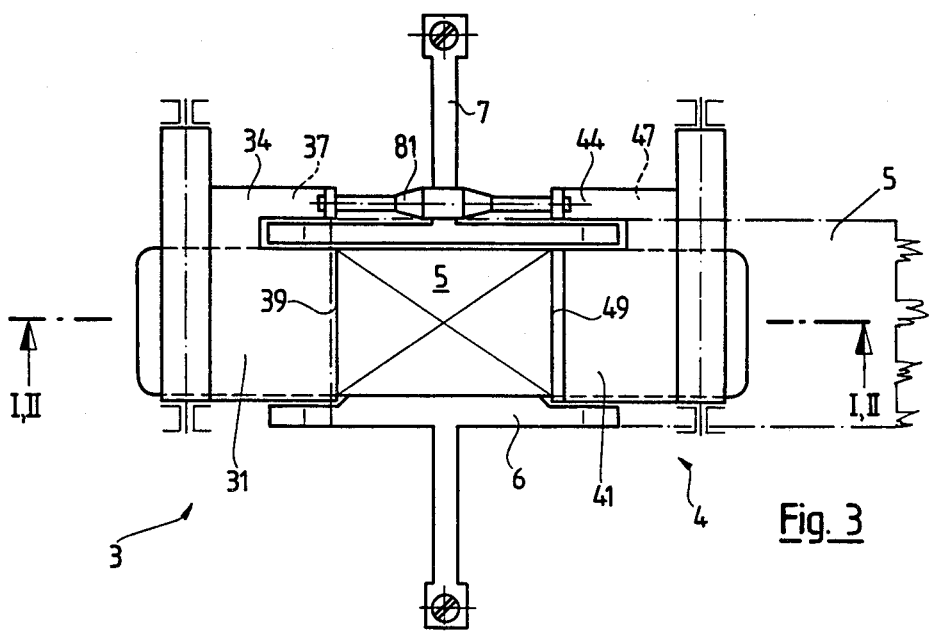
FIG. 3 is a top view of the positioning device.

The two pairs of flap clamps 3 and 4 are arranged in the area of an exposure window 12 disposed in the master stage 1. Each pair comprises two flaps 31, 32 and 41, 42, with one of each pair being located above the master plane 11 and the under underneath it. The two flaps of each pair pivot around axles 33 and 43, which are parallel to the focal plane and perpendicular to the direction of transport (arrow P) of the copy masters. Thus, the flaps can be opened and closed in the manner of a beak, essentially symmetrically with respect to the plane 11 of the stage, as shown in FIGS. 1 and 2.

Figure 4:
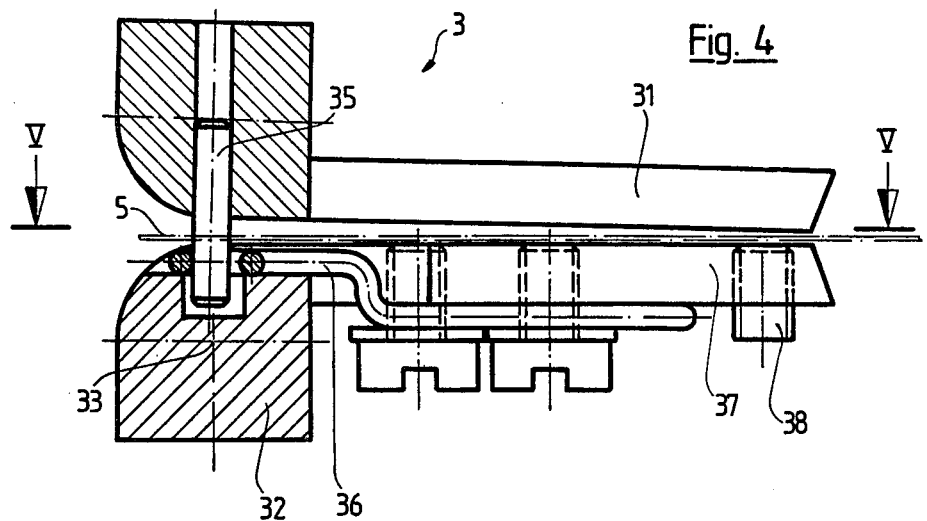
FIG. 4 is an enlarged detail view of a portion of FIG. 2.
Figure 5:
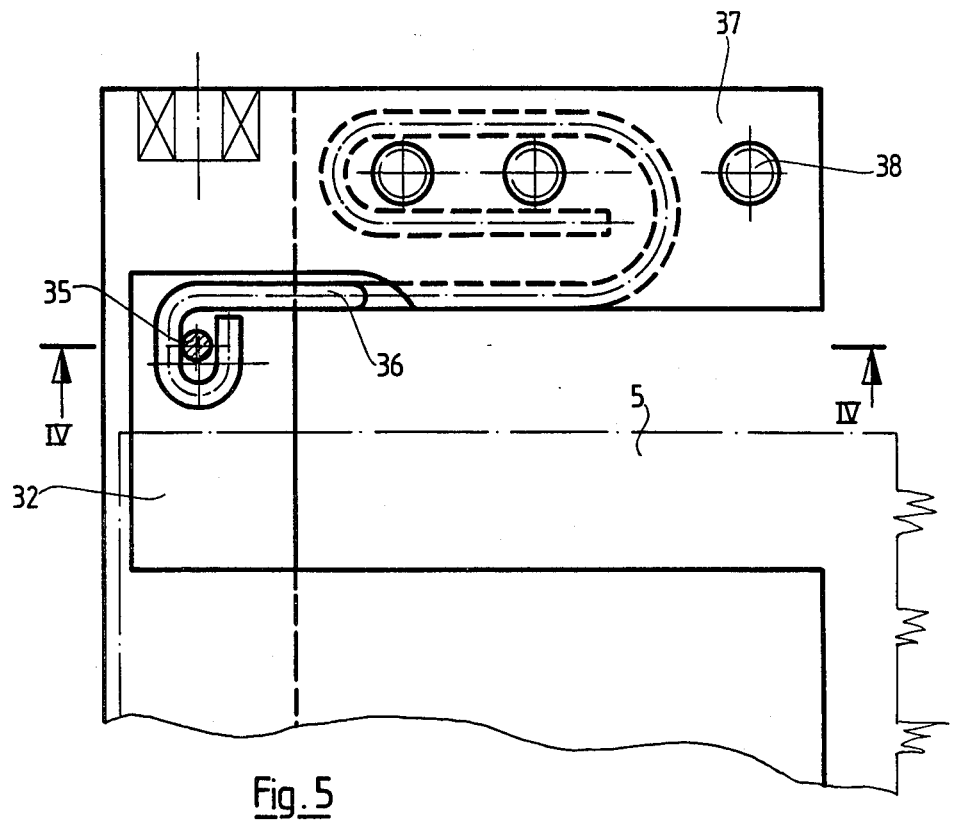
FIG. 5 is a view of a detail taken along the line V—V in FIG. 4.

The flaps 31, 32, 41 and 42 are pivoted by means of an electromagnet 8, which acts on the two upper flaps 31 and 41 through a connecting rod 81 coupling lateral flat tangs 34 and 44. Referring specifically to FIGS. 4 and 5, to couple the two flaps within each pair 3 and 4 of flaps, the upper flaps 31 and 41 are each equipped with a pin 35 and 45, which engages a spring action strap 36 and 46 fastened to a lateral flat tang 37 and 47 of the lower flaps 32 and 42. To limit their movement, the lower flaps 32 and 42 are further provided at their flat tangs 37 and 47 with adjusting screws 38, cooperating with the master stage 1.

The hold-down strips 6 and 7 serve to laterally secure the copy masters on the surface 11 of the master stage 1. They are elastically biased against the master stage and are equipped with entrance and exit bevels.

The mode of operation of the illustrated positioning device is as follows:

The copy masters are introduced with the flap clamp pairs 3 and 4 open (FIG. 1) in the direction of the arrow P. When the image field to be copied is in its correct copying position, the pairs of flaps are electromagnetically closed (FIG. 2), whereupon the front edges 39 and 49 of the flaps 31, 32, and 41, 42 (that extend transversely to the direction of transport of the copy masters) clamp and secure the copy master between them. Lateral clamping is effected by the hold-down strips 6 and 7. Simultaneously, the pairs of flaps 3 and 4, with their front edges 39 and 40, and the hold-down strips 6 and 7 define the format of the image. Following the completion of the copying process, the pairs 3 and 4 of flap clamps are opened and the next image field is brought into copying position.

In the case of the pair 3 of flaps, the front edges 39 are bevelled with an overhang, to assure that the flaps can be opened even if the masters are cut excessively short.

Compared to conventional positioning devices the apparatus embodying the invention has the advantage that the master is always held at both of its front and rear edges, whereby an absolutely flat positon of the master is achieved. In particular, the device according to the invention is suitable for copy masters in which individual images or short strips of films are mounted spaced apart on a carrier strip.

It will be appreciated by those of ordinary skill in the art that the present invention can be embodied in other specific forms without departing from the spirit or essential characteristics thereof. The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A device for positioning a copy master in the master plane of a copying apparatus, comprising a master stage having an exposure window, two pairs of flap clamps disposed spaced apart in the direction of transport of a master, each pair having an upper and a lower flap, with the upper flaps being located above the master plane and the lower flaps under said master plane, said flaps being pivotable around axes extending essentially perpendicular to the transport direction of the copy master and symmetrically relative to said master plane to open and close in the manner of a beak, and means for actuating said flaps.

2. The positioning device of claim 1, wherein the pairs of flaps include two straight clamping edges which extend perpendicular to the transport direction of the copy master and between which a copy master is held when the flaps are closed.

3. The positioning device of claim 1 further including hold-down strips that extend in a direction parallel to the direction of transport of the master and that are elastically biased against said master stage for holding the lateral edges of a master against said master stage.

4. The positioning device of claim 1, wherein the upper and lower flaps of each pair of clamps are kinematically coupled with each other.

5. The positioning device of claim 4, wherein said actuating means includes an electromagnet that is common to both pairs of clamps.

6. The positioning device of claim 4, wherein said kinematric coupling operates with spring deflection, with one flap of a pair of flaps being driven directly by said actuating means and the other flap of the pair being driven indirectly through the said one flap.

7. The positioning device according to claim 6, wherein said indirectly driven flap of each pair of flaps is provided with adjustable stop means cooperating with the master stage for adjustment of its position with respect to the master plane.

8. The positioning device according to claim 1, wherein the flaps of the downstream pair of flaps in the direction of transport have bevelled, overhanging edges.

* * * * *